Patented Dec. 8, 1925.

1,564,824

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

PROCESS FOR VULCANIZING RUBBER AND PRODUCTS OBTAINED THEREBY.

No Drawing.    Application filed May 15, 1922.    Serial No. 561,022.

*To all whom it may concern:*

Be it known that I, SIDNEY M. CADWELL, a citizen of the United States, residing in Leonia, county of Bergen, State of New Jersey, have invented certain new and useful Improvements in Processes for Vulcanizing Rubber and Products Obtained Thereby, of which the following is a full, clear, and exact description.

This invention relates to the acceleration of vulcanization of rubber and more particularly to acceleration by organic substances containing sulphur.

One object of the invention is to provide a simple and inexpensive process of the kind mentioned employing accelerators which may be easily procured from inexpensive raw materials and which constitute stable and odorless compounds. Another object of the invention is to provide a series of products having high tensile strength, resistance to ageing, resistance to flexing and other desirable physical characteristics.

The invention accordingly consists in a process for vulcanizing rubber or similar materials which comprises combining a vulcanizing agent with rubber and thioaldehyde, and vulcanizing the rubber. It also includes combining with rubber a vulcanizing agent, an aldehyde and an alkaline nitrogenous body, and vulcanizing the rubber. It also includes products therefrom.

In carrying out the invention in one form 100 parts of rubber or similar material, 10 parts of zinc oxide, 3 parts of sulphur and 3 parts of para chlorthiobenzaldehyde are mixed by milling in the usual manner at an elevated temperature and cured in a mold by steam at a pressure of 40 lbs. per square inch for 60 minutes at the end of which time vulcanization is complete.

It has been found that acceleration by this class of substances is more readily effected in the presence of certain metals in combination which may be generally designated as M. These metals include zinc, mercury, preferably in the mercuric state, lead, preferably in the plumbous state, cadmium, copper, preferably in the cupric state, arsenic, preferably in the arsenous state, manganese, preferably in the manganous state. These metals may be present as their oxides whose general formula is $M_xO_y$. The metals may be present in the form of their salts or other compounds.

Para chlorthiobenzaldehyde may be prepared in any desired manner. Preferably it is formed by passing hydrogen sulphide into an alcoholic solution of para chlorbenzaldehyde and collecting the white precipitate which is produced. It is a practically odorless white solid, melting at 74 to 84° C.

In general members of this class of compounds are prepared by treating aldehydes, preferably with hydrogen sulphide in neutral or basic solution. Acceleration by members of this class formed by treatment of the corresponding aldehydes with hydrogen sulphide in acid solution have been found to be less rapid than those formed in neutral or basic solution.

Certain members of the class that are formed in neutral or basic solution are preferably employed with a base to provide rapid acceleration. For example, the substance thiometaformaldehyde which is formed by interaction of hydrogen sulphide with formaldehyde in a basic solution is preferably employed with an amine or ammonia. The following procedure has been found to give satisfactory results in the use of this material: 100 parts of rubber are mixed with 10 parts of zinc oxide, 3 parts of sulphur, 3 parts of thiometaformaldehyde and 2 parts of aniline. Vulcanization is carried on in a mold under 40 lbs. steam pressure for approximately 60 minutes when vulcanization is complete. It will be understood that other amines than aniline, either aromatic or aliphatic, may be employed in place thereof.

Other members of this group of compounds are as follows: thioheptaldehyde, thiobenzaldehyde, thiochloral, thiofurfuraldehyde, thiocinnamylaldehyde, para dimethylaminothiobenzaldehyde, para chlorthiobenzaldehyde, orthochlorthiobenzaldehyde, metal nitrothiobenzaldehyde.

These substances have all been employed in the vulcanization of rubber in accordance with the invention, and have been found to produce satisfactory vulcanization.

These aldehydes may be employed in their simple form or in the form of their polymers or as a mixture of the simple form and polymer and the same is true of the other members of the group. The above compounds are examples of alkylated and arylated thioaldehydes and may be most conveniently described as Al-CSH and Ar-CSH where Al and Ar represent alkyl and aryl groups respectively. In the above list the first and third mentioned compounds are alkylated thioaldehydes, the second, fourth, fifth and the following compounds are illustrative of arylated thioaldehydes.

Although mixing of the rubber and vulcanizing ingredients is carried out by milling as indicated above, it will be understood that various other methods of compounding rubber with vulcanizing ingredients may be employed. Instead of milling together the rubber and vulcanizing ingredients simultaneously as above set forth, the procedures given in my co-pending application Serial No. 441,691, filed February 1, 1921, may be employed. As an example of such a procedure employing accelerators of the class herein presented is cited the following:— 100 parts of rubber, 10 parts of zinc oxide, 3 parts of sulphur, and 3 parts of thiometaformaldehyde are mixed together by milling and the mixture so prepared is formed as a sheet of approximately ⅛" thickness. The sheet so formed is then subjected to aniline vapor at 212° F. for 1 hour whereupon sufficient aniline is absorbed to permit vulcanization by the other vulcanizing ingredients and aniline. The mass so prepared is then subjected to a temperature of approximately 40 lbs. steam pressure in a mold for 60 minutes when vulcanization is complete.

A compound containing rubber, zinc oxide, sulphur and metathioformaldehyde may be painted with aniline or other amine. In place of aniline various other amines may be employed either solid liquid or gaseous. As an example of the use of a gaseous amine, the compound of rubber, zinc oxide, sulphur and metathioformaldehyde may be subjecter to methyl amine gas until a sufficient amount has been absorbed to permit vulcanization with the other ingredients already compounded whereupon the material is subjected to heat until vulcanization has been accomplished. A similar process may be accomplished with ammonia replacing methyl amine.

The process employing the accelerators mentioned is a simple and inexpensive one. The accelerators themselves it will be observed can be prepared generally from inexpensive raw materials. The acceleration accomplished is rapid. Many of the accelerators and products therefrom are substantially odorless and the accelerators themselves are generally stable substances. Many of the vulcanized rubber products have good resistance to ageing and flexing.

It is to be understood that rubber substitutes, balata, gutta percha, etc., may be similarly treated instead of rubber and it is intended to cover such processes in the claims.

It will thus be seen that among others the objects of the invention above set forth are achieved.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for vulcanizing rubber which comprises combining a vulcanizing agent with rubber and a thioaldehyde, and vulcanizing the rubber.

2. A process for vulcanizing rubber which comprises combining a vulcanizing agent with rubber and a thioaldehyde in the presence of a combined metal M, and vulcanizing the rubber.

3. A process for vulcanizing rubber which comprises combining a vulcanizing agent with rubber, a thioaldehyde and an amine, and vulcanizing the rubber.

4. A process for vulcanizing rubber which comprises combining a vulcanizing agent with rubber, a thioaldehyde in the presence of a combined metal M and an amine, and vulcanizing the rubber.

5. A process for vulcanizing rubber which comprises combining a vulcanizing agent with rubber, a thioaldehyde and an alkaline nitrogenous material, and vulcanizing the rubber.

6. A process for vulcanizing rubber which comprises combining a vulcanizing agent with rubber, a thioaldehyde and an amine, and vulcanizing the rubber.

7. A process for vulcanizing rubber which comprises combining a vulcanizing agent with rubber, a thioaldehyde and ammonia, and vulcanizing the rubber.

8. A process for vulcanizing rubber which comprises combining a vulcanizing agent with rubber, an alkylated thioaldehyde and an alkaline nitrogenous material, and vulcanizing the rubber.

9. A process for vulcanizing rubber which comprises combining a vulcanizing agent with rubber, an alkylated thioaldehyde and an amine, and vulcanizing the rubber.

10. A process for vulcanizing rubber which comprises combining a vulcanizing agent with rubber, thiometaformaldehyde and an amine, and vulcanizing the rubber.

11. A process for vulcanizing rubber which comprises combining a vulcanizing agent with rubber, thiometaformaldehyde and aniline, and vulcanizing the rubber.

12. A process for vulcanizing rubber which comprises treating rubber with a vulcanizing agent and a thioaldehyde, then exposing the mixture to an amine, and vulcanizing the rubber.

13. A process for vulcanizing rubber which comprises treating rubber with a vulcanizing agent and a thioaldehyde, then exposing the mixture to an amine in the form of a gas, and vulcanizing the rubber.

14. A process for vulcanizing rubber which comprises treating rubber with a vulcanizing agent and an alkylated thioaldehyde and exposing the rubber to an organic amine, and vulcanizing the rubber.

15. A process for vulcanizing rubber which comprises treating rubber with a vulcanizing agent and an alkylated thioaldehyde and exposing the rubber to aniline, and vulcanizing the rubber.

16. A vulcanized rubber derived from rubber combined with a vulcanizing agent and a thioaldehyde.

17. A vulcanized rubber derived from rubber combined with a vulcanizing agent and a thioaldehyde in the presence of a combined metal M.

18. A vulcanized rubber derived from rubber combined with a vulcanizing agent, a thioaldehyde and an amine.

19. A vulcanized rubber derived from rubber combined with a vulcanizing agent, a thioaldehyde in the presence of a combined metal M and an amine.

20. A vulcanized rubber derived from rubber combined with a vulcanizing agent, a thioaldehyde and an alkaline nitrogenous material.

21. A vulcanized rubber derived from rubber combined with a vulcanizing agent, a thioaldehyde and an amine.

22. A vulcanized rubber derived from rubber combined with a vulcanizing agent, a thioaldehyde and ammonia.

23. A vulcanized rubber derived from rubber combined with a vulcanizing agent, an alkylated thioaldehyde and an alkaline nitrogenous material.

24. A vulcanized rubber derived from rubber combined with a vulcanizing agent, an alkylated thioaldehyde and an amine.

25. A vulcanized rubber derived from rubber combined with a vulcanizing agent, thiometaformaldehyde and an amine.

26. A vulcanized rubber derived from rubber combined with a vulcanizing agent, thiometaformaldehyde and aniline.

27. A vulcanized rubber derived from rubber treated with a vulcanizing agent and a thioaldehyde, and exposed to an amine.

28. A vulcanized rubber derived from rubber treated with a vulcanizing agent and a thioaldehyde, and exposed to an amine in the form of a gas.

29. A vulcanized rubber derived from rubber treated with a vulcanizing agent and an alkylated thioaldehyde, and exposed to an aromatic amine.

30. A vulcanized rubber derived from rubber treated with a vulcanizing agent and an alkylated thioaldehyde and exposed to aniline.

31. A vulcanized rubber derived from rubber treated with sulphur and thiometaformaldehyde, and exposed to the vapors of aniline.

32. A vulcanized rubber derived from rubber treated with sulphur, thiometaformaldehyde and zinc in combined form, and exposed to the vapors of aniline.

Signed at New York, New York, this 9th day of May, 1922.

SIDNEY M. CADWELL.